(12) United States Patent
O'Sullivan

(10) Patent No.: US 11,504,737 B2
(45) Date of Patent: Nov. 22, 2022

(54) PACK FOR ANAEROBICALLY CURABLE COMPOSITIONS

(71) Applicant: Henkel IP & Holding GmbH, Duesseldorf (DE)

(72) Inventor: Peter O'Sullivan, County Kildare (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/858,681

(22) Filed: Apr. 26, 2020

(65) Prior Publication Data

US 2020/0254478 A1 Aug. 13, 2020

Related U.S. Application Data

(63) Continuation of application No. PCT/EP2018/079336, filed on Oct. 25, 2018.

(30) Foreign Application Priority Data

Oct. 27, 2017 (GB) .................................... 1717734

(51) Int. Cl.
*B05C 17/03* (2006.01)
*B05C 17/035* (2006.01)
*C09J 133/08* (2006.01)

(52) U.S. Cl.
CPC ...... *B05C 17/0341* (2013.01); *B05C 17/0357* (2013.01); *C09J 133/08* (2013.01)

(58) Field of Classification Search
CPC ............ B05C 17/0341; B05C 17/0355; B05C 17/0357
See application file for complete search history.

(56) References Cited

U.S. PATENT DOCUMENTS

| 3,218,305 A | 11/1965 | Krieble |
| 3,425,988 A | 2/1969 | Gorman et al. |

(Continued)

FOREIGN PATENT DOCUMENTS

| FR | 1581361 | 9/1969 | |
| GB | 2006712 | * 5/1979 | ............. B65D 51/20 |

(Continued)

OTHER PUBLICATIONS

R.D. Rich, "Anaerobic Adhesives" in Handbook of Adhesives, 29, pp. 467-479, A. Pizzi and K.L. Mittal, eds., Marcel Dekker, Inc., New York (1994.

(Continued)

*Primary Examiner* — J C Jacyna
(74) *Attorney, Agent, or Firm* — Steven C. Bauman

(57) ABSTRACT

A pack comprising: a dispenser for anaerobically curable composition; and anaerobically curable composition held within the dispenser. The dispenser has
(a) a reservoir in which anaerobically curable composition is held, the reservoir having an outlet through which the anaerobically curable composition can be dispensed;
(b) a dispensing pump for pumping the anaerobically curable composition from the reservoir out through the outlet.

The reservoir and pump together form an airless pump assembly. An applicator with an applicator surface, for example a roller, is in communication with the outlet, the applicator for applying to a substrate the anaerobically curable composition that is dispensed by the pump from the reservoir out through the outlet. The pack provides a convenient way of forming of applying anaerobically curable composition in a thin even layer.

15 Claims, 7 Drawing Sheets

(56) References Cited

U.S. PATENT DOCUMENTS

| | | | |
|---|---|---|---|
| 4,180,640 A | 12/1979 | Doherty et al. | |
| 4,287,330 A | 9/1981 | Rich | |
| 4,321,349 A | 3/1982 | Rich | |
| 5,605,999 A | 2/1997 | Chu et al. | |
| 6,439,431 B1* | 8/2002 | Breault | B05C 17/015 222/105 |
| 2003/0222249 A1* | 12/2003 | Bunyan | H01L 23/552 252/500 |
| 2005/0105954 A1 | 5/2005 | Haas et al. | |
| 2011/0229247 A1* | 9/2011 | Song | B05C 17/0355 401/147 |
| 2011/0250008 A1* | 10/2011 | Lim | B05B 11/3015 401/188 R |
| 2013/0056020 A1* | 3/2013 | Wilson | A45D 34/041 132/320 |
| 2015/0296957 A1* | 10/2015 | Megaro | B05B 11/0038 132/200 |
| 2017/0145196 A1 | 5/2017 | O'Sullivan | |

FOREIGN PATENT DOCUMENTS

| | | | | |
|---|---|---|---|---|
| GB | 2186544 | | 8/1987 | |
| KR | 20110123974 | | 11/2011 | |
| WO | WO2016019998 | * | 2/2016 | C08J 5/00 |

OTHER PUBLICATIONS

International Search Report issued in International Patent Application No. PCT/EP2018/079336 dated Dec. 20, 2018.

* cited by examiner

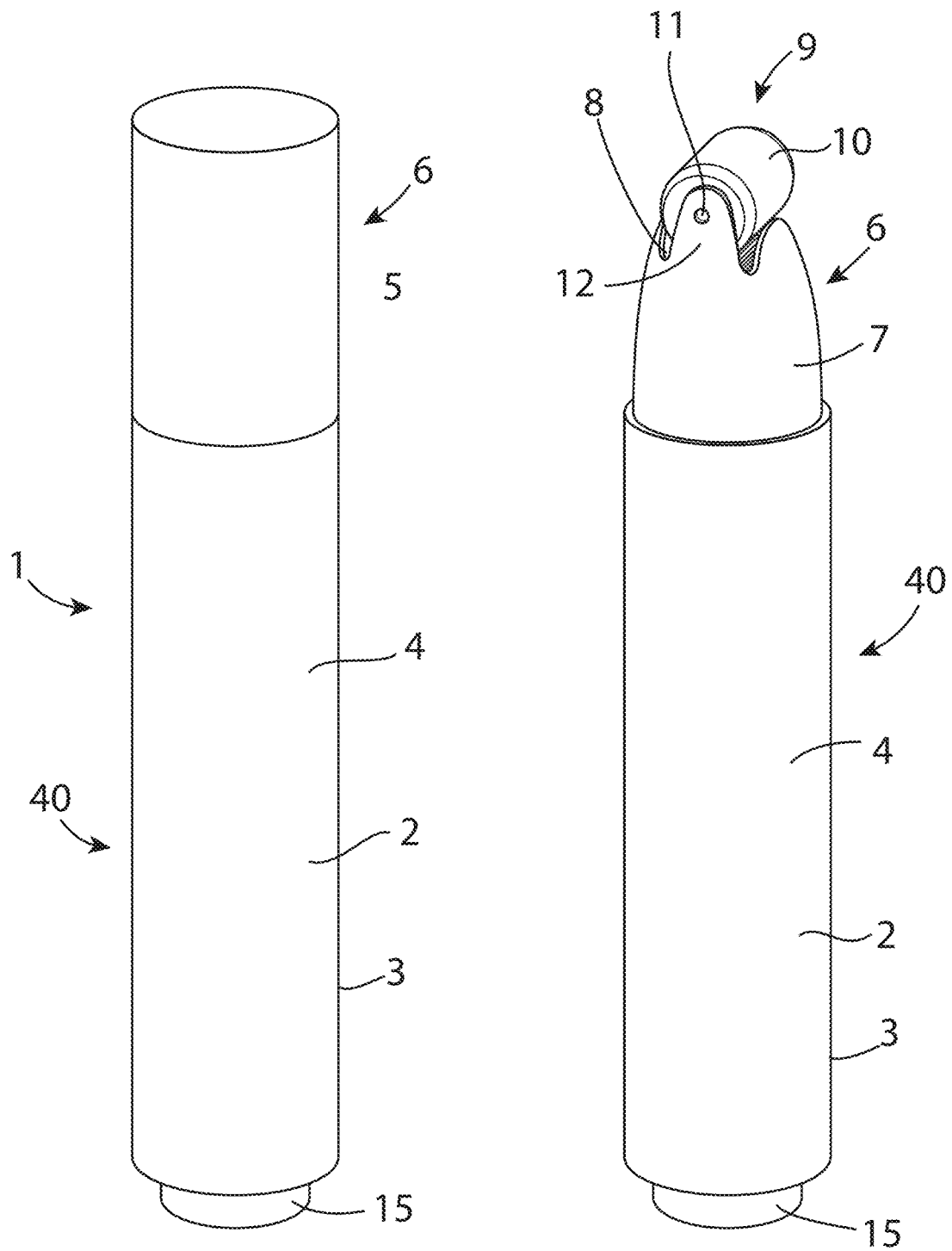

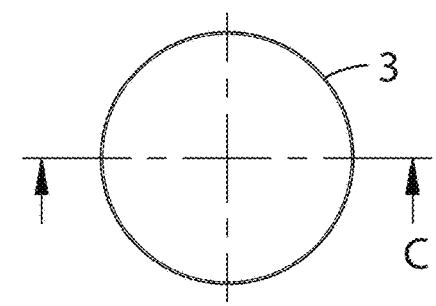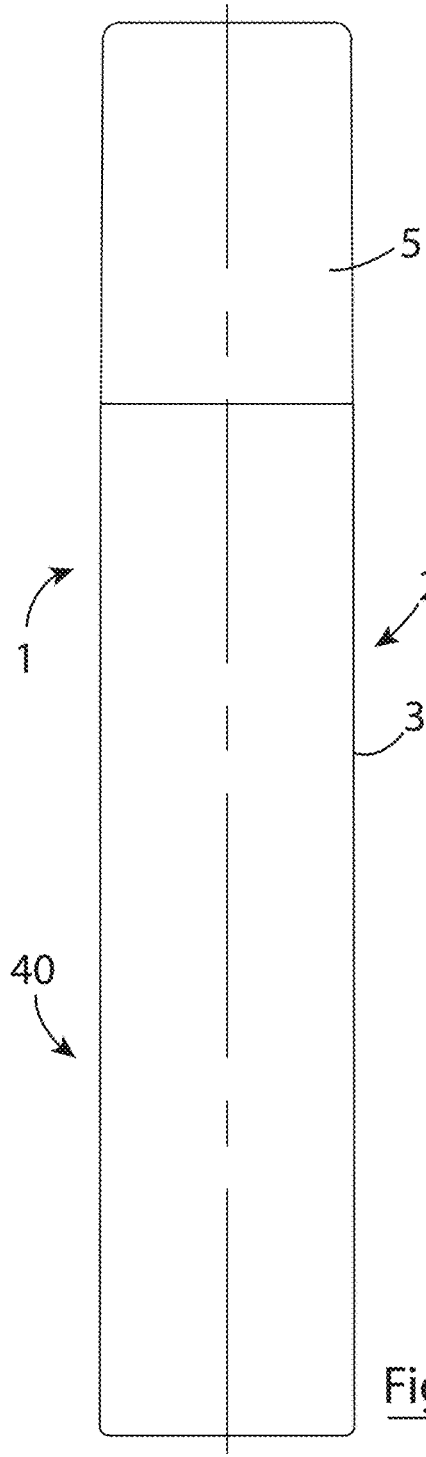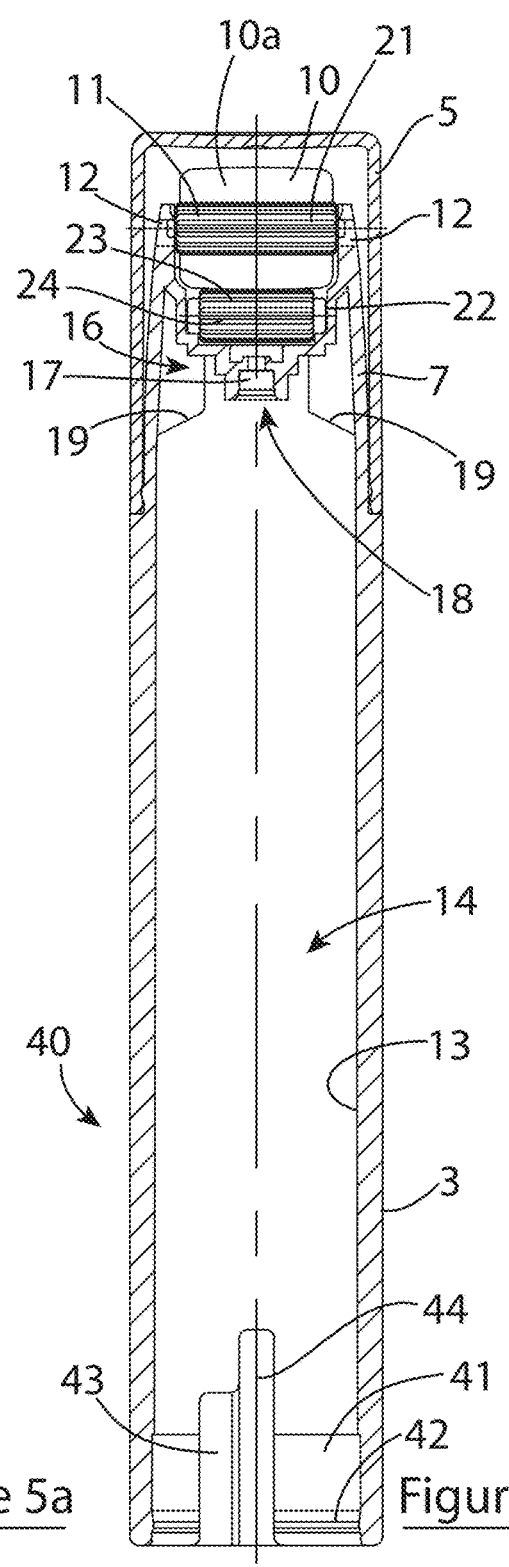
Figure 5a    Figure 5b

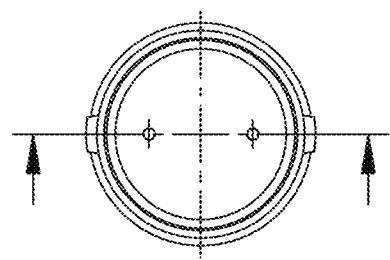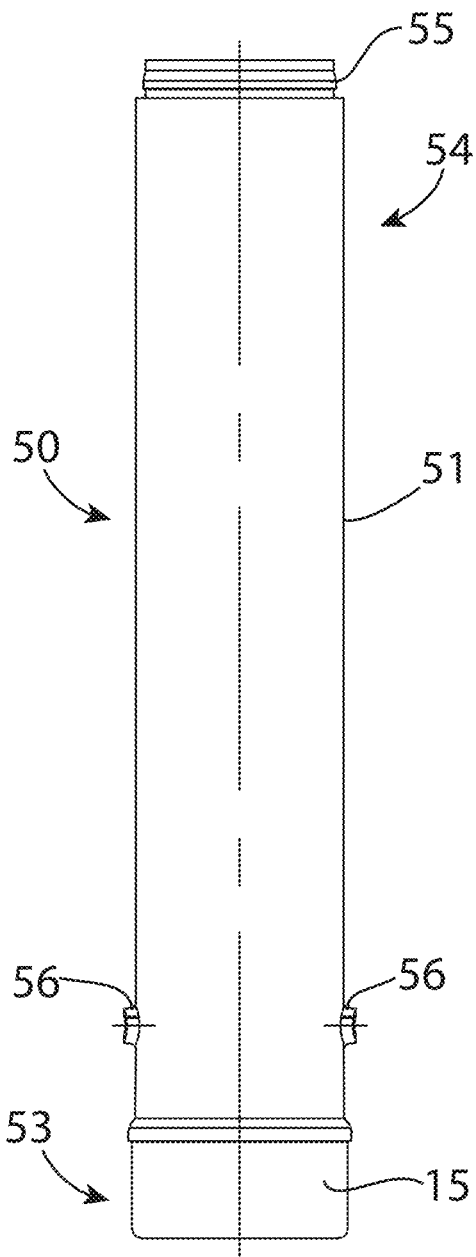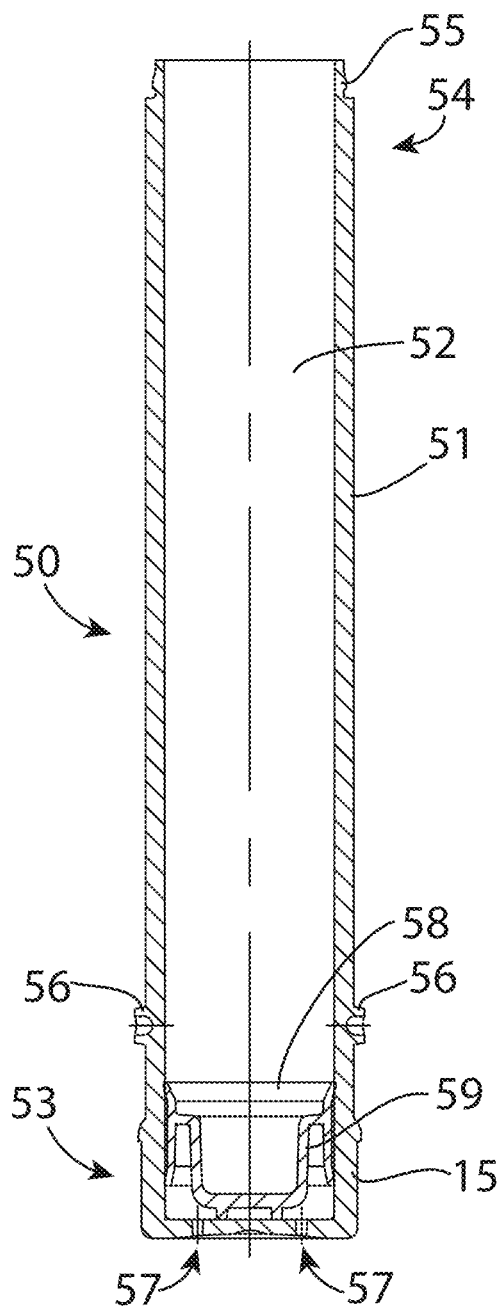
Figure 6a    Figure 6b

PACK FOR ANAEROBICALLY CURABLE COMPOSITIONS

FIELD OF THE INVENTION

The present invention relates to a pack for anaerobically curable compositions, in particular anaerobic sealants and adhesives, in particular liquid products. Anaerobically curable compositions such as adhesives and sealants cure, set-up or polymerise in the absence of oxygen (air).

BRIEF DESCRIPTION OF RELATED ART

Containers for storing anaerobically curable compositions such as anaerobic adhesive and sealant products are known. Typically such containers may be constructed from plastic, having substantially rigid walls.

Such containers are made from air-permeable material which allow air through their walls etc. This air may replace air in the headspace or may permeate into the product within the container. However in order to ensure stability of anaerobic products permeation into the headspace alone is not sufficient to ensure adequate shelf-life. The air must permeate through the product also to ensure curing, setting up or polymerisation of the product does not occur. Typically 30% to 60% of the internal volume of the container is left unfilled with anaerobic product, depending on the air permeability of the container in order to give a sufficient shelf-life. This allows a sufficient volume of air (oxygen) to remain within the container to help stabilise the anaerobic product.

An issue that arises is how to dispense the anaerobically curable compositions. They are liquid and are often dispensed in the form of a bead of material. For example, a bead of material is applied to a first substrate, and then a second substrate to be mated with the first, is mated with the first substrate. Sufficiently close mating excludes sufficient air to provide an anaerobic environment which is sufficient to effect cure of the anaerobically curable composition. For example, anaerobically curable compositions are often applied as a bead on a flange about an opening in a substrate such as a gearbox. When a second substrate is mated with the flange, for example where a gearbox lid is mated with a gearbox, the anaerobically curable composition cures to form a gasket seal between the two parts.

For repeated application, for example in a production line scenario, dispensing equipment can be utilised to dispense the anaerobically curable composition. For example a dispenser which dispenses the anaerobically curable composition through a nozzle may be utilised. Any such equipment must not however cause premature cure of any undispensed anaerobically curable composition.

Furthermore it is desirable that the function of the dispenser is reliable and can repeatedly dispense even when there are time delays between dispensing actions. For example it is desirable that the dispenser does not become contaminated with cured product which inhibits application, or blocks flow, of the product being dispensed.

Notwithstanding the dispensing equipment that is available it is desirable to provide alternative ways to store and/or dispense anaerobically curable compositions. In particular it is desirable to have a dispenser which can dispense a continuous bead of material. Broken beads can lead to imperfect sealing. Furthermore, it is desirable to have a dispenser which can prevent the application of excessive material. Excessive material causes potential contamination. For example when two substrates are joined together, excessive material may ooze out. This is wasteful, potentially causes contamination, and may result in an aesthetically unpleasing finish.

SUMMARY OF THE INVENTION

In one aspect, the present invention provides a pack comprising: a dispenser for anaerobically curable composition; and anaerobically curable composition held within the dispenser, the dispenser comprising:
  (i) a reservoir in which anaerobically curable composition is held, the reservoir having an outlet through which the anaerobically curable composition can be dispensed;
  (ii) a dispensing pump for pumping the anaerobically curable composition from the reservoir out through the outlet;
wherein the reservoir and pump together form an airless pump assembly, and an applicator in communication with the outlet with an applicator surface, the applicator for applying to a substrate the anaerobically curable composition that is dispensed by the pump from the reservoir out through the outlet.

This provides a simple yet effective pack for applying anaerobically curable composition. In particular, instead of applying the anaerobically curable composition in the form of a bead of material, it can be applied as a flat thin even layer. The anaerobically curable composition is spread as it is applied. This contrasts with dispensers of the prior art which apply a bead and thereafter the bead has to be spread.

The applicator may be a roller for example a foam roller. It will be appreciated that rolling the roller back and forward allows for even application of a layer of anaerobically curable composition.

It will be appreciated that a dispenser of the invention can dispense and apply product in any orientation, for example even upside down i.e. with the applicator for example a roller pointing upwardly. It will be appreciated that it is not generally possible to apply a bead of material in such an orientation as it is likely to fall off the surface to which it is being applied.

Desirably the pack of the invention further comprises a spreader which regulates dispensing of anaerobically curable composition onto the applicator so that the anaerobically curable composition is spread across the entire applicator surface. Again it will be appreciated that the spreader allows for application of the anaerobically curable composition as a flat thin even layer instead of in the form of a bead. For example when the applicator is in the form of a roller, then the spreader ensures that there is an even distribution of anaerobically curable composition across the surface area of the roller.

The spreader which regulates dispensing of anaerobically curable composition onto the applicator may be a roller. For example when the spreader is in the form of a roller and the applicator is in the form of a roller, the spreader roller desirably spreads the anaerobically curable composition across the surface area of the applicator roller. Again this allows for the application of a desired amount and even distribution of anaerobically curable composition across the surface area of the applicator roller and in turn across the surface area of the substrate to which the anaerobically curable composition is to be applied.

When the spreader is in the form of a roller it is desirable that the spreader roller is mounted within an immersion chamber in which, in use, it is immersed in anaerobically curable composition. The spreader roller is desirably fluted having elongate parallel ribs which are evenly spaced about its circumference and which are aligned with the axis of rotation of the roller. This assists with the even application of anaerobically curable composition onto the applicator roller.

A pack according to the present invention may have a piston within the reservoir that progressively reduces the reservoir volume with dispensing of anaerobically curable composition. The volume of the anaerobically curable composition and the volume of the reservoir will thus both reduce as anaerobically curable composition is dispensed. The piston and the seal thus move (in response to the pumping action) in a manner consistent with an airless pump assembly.

In this respect "piston" is used to refer to a sliding seal arrangement. There is no requirement for any piston rod. In an airless pump assembly of the present invention there is no need for a siphon tube which extends to the bottom of the reservoir.

In a pack of the invention the reservoir has opposing ends and the dispensing pump is provided on the same end of the reservoir as the outlet.

A pack of the invention may have a valve for the outlet that is biased towards a closed position and wherein pumping by the dispensing pump draws the anaerobically curable composition through the valve so as to dispense the anaerobically curable composition out through the outlet.

A pack of the invention may be in the form of an outer housing into which a cartridge is inserted. So a dispenser of the invention may further comprise a housing wherein the reservoir and pump are assembled together in the form of a cartridge that is insertable into the housing. This means that the housing can be utilised multiple times if desired. Also, the cartridge may be refillable. In such an arrangement it is desirable that the applicator is on the housing. In such an arrangement and where a pack of the invention comprises a spreader which regulates dispensing of anaerobically curable composition onto the applicator so that the anaerobically curable composition is spread across the entire applicator surface it is desirable that the spreader is located within a chamber in the housing.

The cartridge and/or the outer housing may be constructed of polypropylene ("PP"). The cartridge and/or the outer housing may be constructed of a transparent material. The transparent material may be PP.

The material forming the cartridge, i.e. the cartridge wall may be from about 1.8 to about 2.5 mm thick. For example it may be from about 1.9 to about 2.3 mm thick, such as about 2.1 mm thick.

The material forming the outer housing i.e. the outer housing wall may be from about 2.8 to about 3.6 mm thick. For example it may be from about 3 to about 3.4 mm thick, such as about 3.2 mm thick.

It is desirable that the dispenser has an elongate body for example taking the form of a pen-like dispenser/applicator. This makes it suitable for being held in a user's hand and is thus suitable for manual application of anaerobically curable composition.

Desirably the cartridge is at least 4 times, for example at least 5 times, greater in length that its diameter.

It is surprising that an anaerobically curable material is stable in a pack of the invention.

In a pack of the invention the reservoir and pump may be assembled together with the pump provided on a closure for the reservoir. In such an arrangement, the pump/closure can be removed for filling of product into the reservoir and then replaced.

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds.

Oftentimes anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenylhydrazine ("APH") with maleic acid. See e.g. U.S. Pat. Nos. 3,218,305 (Krieble), 4,180,640 (Melody), 4,287,330 (Rich) and 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

The (meth)acrylate component may be a (meth)acrylate monomer having the formula: $H_2C=CGCO_2R^8$,
where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

Additional (meth)acrylate monomers suitable for use herein include polyfunctional (meth)acrylate monomers, such as, but not limited to, di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Other suitable monomers include polyacrylate esters represented by the formula

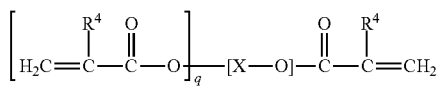

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

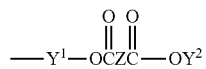

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other classes of useful monomers are the reaction products of di- or tri-alkylolamines (e.g., ethanolamines or propanolamines) with acrylic acids, such as are disclosed in French Pat. No. 1,581,361.

Oligomers with (meth)acrylate functionality may also be used. Examples of useful (meth)acrylate-functionalized oligomers include those having the following general formula:

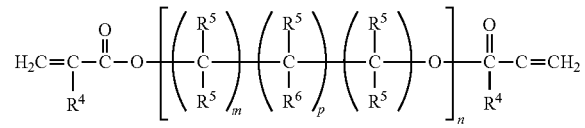

where $R^5$ represents a radical selected from hydrogen, alkyl of from 1 to about 4 carbon atoms, hydroxy alkyl of from 1 to about 4 carbon atoms, or

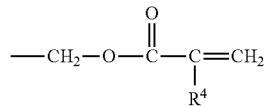

where $R^4$ is a radical selected from hydrogen, halogen, or alkyl of from 1 to about 4 carbon atoms; $R^6$ is a radical selected from hydrogen, hydroxyl, or

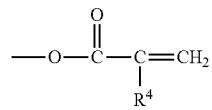

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from labile hydrogen, heterocyclic ring, hydroxy, amino, cyano, and halo polar groups.

Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use have the formula:

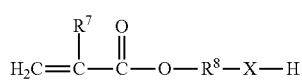

where X is selected from —O— and

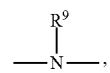

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with a polyisocyanate, yield a monomer of the following general formula:

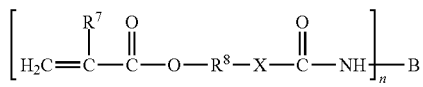

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 up to about 5,000) or in the polymer class (such as about greater than 5,000).

Of course, combinations of these (meth)acrylate monomers may also be used.

The (meth)acrylate component should comprise from about 10 to about 98 percent by weight of the composition, such as about 60 to about 95 percent by weight, based on the total weight of the composition.

The anaerobically curable compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

The anaerobically curable compositions may be prepared using conventional methods which are well known to those persons of skill in the art. For instance, the components of the inventive composition may be mixed together in any convenient order consistent with the roles and functions the components are to perform in the compositions. Conventional mixing techniques using known apparatus may be employed.

The compositions may be applied to a variety of substrates to perform with the desired benefits and advantages described herein. For instance appropriate substrates may be constructed from steel, brass, copper, aluminium, zinc, and other metals and alloys, ceramics and thermosets. They are suited to metal to metal bonding.

The compositions have applications in metal-metal bonding, for example as threadlocking compositions, for securing for example nuts and bolts. The product cures when confined in the absence of air between close fitting metal surfaces. It protects threads from rust and corrosion and prevents loosening from shock and vibration.

The compositions have applications in gasketing for example by providing gasket seals, such as in gear box assemblies, clutch assemblies, motor mounts etc.

The compositions are capable of curing in the substantial absence of air.

BRIEF DESCRIPTION OF THE DRAWINGS

Embodiments of the invention will be described, by way of example only, with reference to the accompanying drawings in which:

FIG. 1 is a perspective view of a pack of the invention which is a dispenser in which anaerobically curable composition is held;

FIG. 2 is the same view as FIG. 1 but with a cap removed;

FIG. 5a is a side plan view of an outer container of a pack of the invention which is a dispenser in which anaerobically curable composition is held and illustrating the cross sectional view of FIG. 5b;

FIG. 5b is a cross-sectional view of the outer container of the pack of the invention taken along the plane indicated by the arrows in FIG. 5a;

FIG. 6a is a side plan view of a cartridge which when inserted into the outer container of FIGS. 5a and 5b forms a pack of the invention and indicating the cross sectional view C-C which is shown in FIG. 6b;

FIG. 6b is a cross-sectional view, of a cartridge which when inserted into the outer container of FIGS. 5a and 5b forms a pack of the invention, and taken along the plane indicated by the arrows in FIG. 6a;

FIG. 7b is a cross-sectional view of the pump taken along the plane indicated by the arrows in FIG. 7a.

DETAILED DESCRIPTION OF THE DRAWINGS

Figure 3:
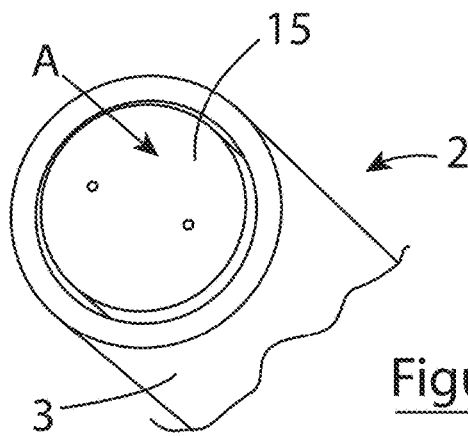
FIG. 3 is a partial perspective end view of the dispenser of earlier figures illustrating a push button forming part of an airless pump assembly.

The present invention will now be described reference to the drawings.

The invention comprises a pack 1. The pack 1 comprises a dispenser 2 for dispensing anaerobically curable composition which is within the dispenser 2.

The dispenser 2 has an elongate body 3 which takes the form of a pen-like dispenser/applicator 4. It is suitable for being held in a user's hand and is thus suitable for manual application of anaerobically curable composition.

The pack 1 comprises an outer container 40; a cartridge 50 (see FIGS. 6*a*;6*b* 8*a*;8*b*) and a pump 60 (see FIGS. 7*a*;7*b* 8*a*;8*b*) all assembled together (see FIGS. 8*a*;8*b*) to form the dispenser 2.

In FIG. 1 the pack 1 comprises a lid 5 that has been provided on a dispensing end 6 of the dispenser 2. In FIG. 2 the lid 5 is removed. The lid 5 may be any suitable type that can be removed and replaced multiple times including a snap-fit lid.

On the dispensing end 6 is a dispensing head 7 which is dome-shaped though of course any suitable shaped head may be utilised. The dispensing head 7 has defined therein an outlet 8. Anaerobically curable composition is dispensed out through the outlet 8 as will be described in more detail below.

An applicator 9, which may be a foam applicator such as a foam roller 10, is mounted on the dispensing head 7. The applicator 9 is in communication with the outlet 8 for applying the anaerobically curable composition dispensed by the dispenser 2. It will be appreciated that the foam roller 10 can be rolled along a substrate to which anaerobically curable composition is to be applied.

The roller 10 is mounted for rotation on an axle 11 between two mounting brackets 12.

A foam applicator such as foam roller 10 wherein at least an outer sleeve or covering comprises a material which is compatible with anaerobically curable composition. Suitable foam materials that may be utilised as an applicator include foams based on the following: nitrile butadiene rubber, polyurethane and polyolefin. Other materials (including non-foam materials) may be utilised for example the roller may be constructed of a silicone material. An elastomeric material may be used, for example a silicone rubber material may be used.

At the opposite end (to the dispensing end 6) is a spring-loaded push button 15 which forms part of an airless pump mechanism (the operation of the airless pump mechanism will be described in more detail below).

Pushing the button 15 in the direction of arrow A (into the dispenser body 3) as shown in FIG. 3 creates a dispensing pressure for dispensing anaerobically curable composition. When the pushing force is released the button 15 returns to its original position (as shown in FIGS. 1 and 2). The user can thus create sufficient dispensing pressure to dispense the amount of anaerobically curable material that they wish to use by pushing the button 15 as many times as is necessary. In the first instance the material is dispensed onto the roller 10 and then the roller 10 is used to apply the material.

Figure 4:
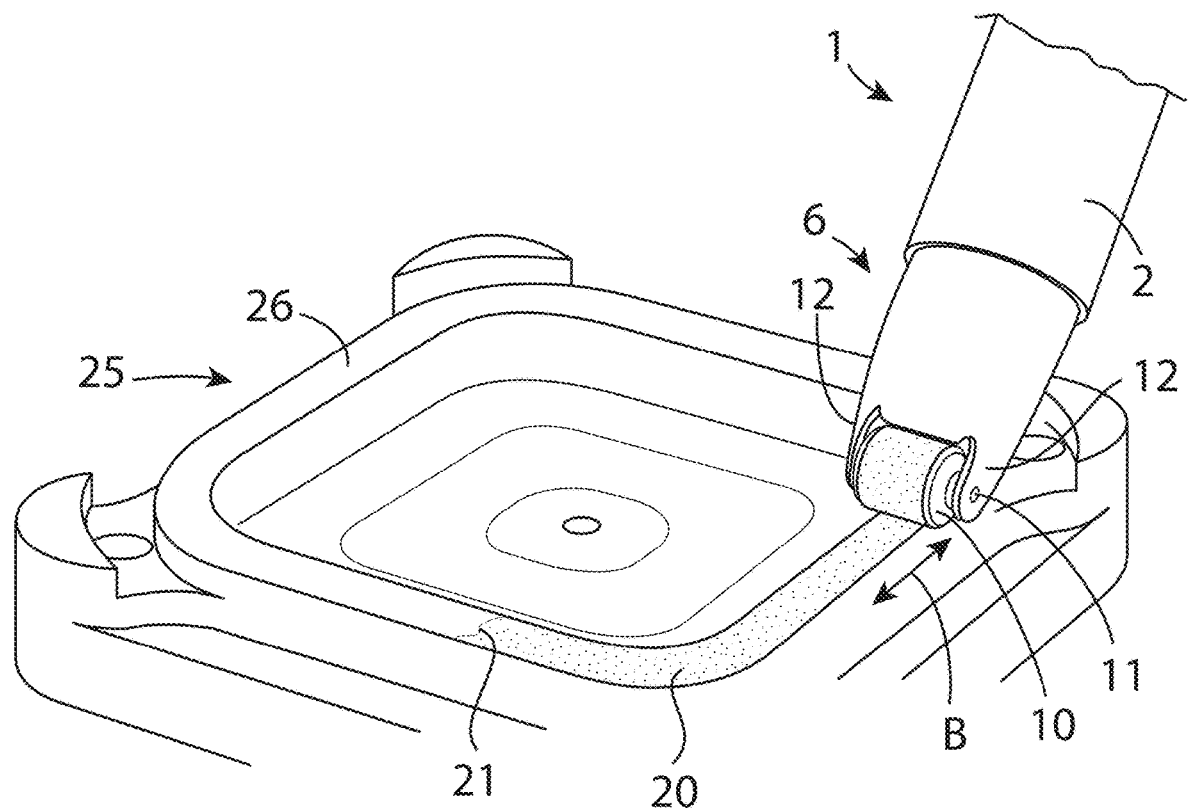
FIG. 4 is a partial perspective view of a pack of the invention being used to dispense anaerobically curable composition onto the flange of a substrate.

FIG. 4 shows a pack 1 of the invention being used to dispense anaerobically curable composition 20 onto the flange 26 of a substrate 25. The applied anaerobically curable composition 20 is depicted in the drawing as the area with dotted filling starting at the point 21 and continuing around the flange 26 to the foam roller 10. As the foam roller 10 has had anaerobically curable composition 20 dispensed onto it, and in turn has been used to apply the anaerobically curable composition 20, the roller 10 is depicted with dotted filling to represent the anaerobically curable composition 20 on the roller 10.

It will be appreciated that the roller 10 can be moved back and forth on the flange 26 to apply a continuous even layer of anaerobically curable composition 20. Exemplary back and forth movement of the roller is indicated by the arrow B in FIG. 4. It will be appreciated that the pack 1 of the invention can be in any orientation while dispensing for example with the applicator such as the roller 10 in a vertical or upside down orientation.

As more anaerobically curable composition is required, the push button 15 can be actuated as many times as is required to provide more anaerobically curable composition 22 to the roller 10. The roller 10 is then used to apply the curable composition.

The pack of the invention dispenses an even, thin continuous layer. This contrasts with dispensers which have been used previously which apply a relatively thick layer in the form of a bead. Accordingly with a pack of the invention there is efficient application of anaerobically curable composition. Also there is accurate application of anaerobically curable composition. Furthermore it is less likely that the anaerobically curable composition will run off as compared to more conventional application with a bead. It will be appreciated that if the anaerobically curable composition had been applied as a bead the bead would be centred on the flange and would not be spread out as with the pack of the invention.

FIG. 5*a* is a side plan view of an outer container 40 of a pack 1 of the invention. FIG. 5*a* also illustrates the plane of the cross sectional view of FIG. 5*b*. FIG. 5*b* is a cross-sectional view of the outer container 40 taken along the plane indicated by the arrows C in FIG. 5*a*.

The outer container 40 has internal walls 13 of the dispenser body 3 which form a housing 14 in which a cartridge 50 containing anaerobically curable composition is inserted and held.

A lower end 41 of the outer container 40 has an annular lip 42 which holds the cartridge 50 in place. A pair of recesses 43,44 (and a corresponding pair on the opposing side of the internal walls 13) are defined in the outer container 40. These engage with corresponding side protrusions on the cartridge 50 as will be described in more detail below.

At the dispensing end 6 of the outer container 40 is a dispensing structure 16 which comprises a dispensing nozzle 17 with an orifice 18. The nozzle 17 is supported by internal support ribs 19 which also reinforce the underside of the dome shape.

The nozzle 17 is in fluid communication with an immersion trough or chamber 22 in which an immersion roller 23 is located. The immersion roller 23 acts as a spreader to evenly spread anaerobically curable composition across the surface area of roller 10. Due to anaerobically curable composition entering the chamber 22 (from nozzle 17) the roller 23 becomes immersed in anaerobically curable composition. The roller 23 is fluted having elongate parallel ribs 24 which are evenly spaced about its circumference and which are aligned with the axis of rotation of the roller 23.

The axle 11 of the foam roller 10 is of a similar construction to the immersion roller 23. The axle 11 can be considered to itself be a roller which is fluted having elongate parallel ribs 21 which are evenly spaced about its circumference and which are aligned with its axis of rotation. The applicator in the form of a roller is then formed by the axle 11 and a sleeve 10*a* of foam material which is a stretch fit onto the axle 11.

As best seen from FIGS. 5*a*; 8*a*; 8*b* the immersion roller 23 and the foam roller 10 are arranged so that torque from foam roller 10 is transmitted to immersion roller 23. This is achieved by arranging them in contact so that rotation of one will drive the other too. So as foam roller 10 is moved back or forth along a substrate such as flange 26 the torque generated is transmitted to immersion roller 23 which then also rotates. It will be appreciated that there is a change in speed of rotation as the immersion roller 23 is smaller than the foam roller 10.

The immersion roller 23 as it rotates picks up anaerobically curable composition that enters the chamber 22 from the nozzle 17 and in turn applies it to the foam roller 10. The immersion roller 23 applies the anaerobically curable composition evenly to the surface of the foam roller 10 as seen from, and as described above in relation to, FIG. 4.

FIGS. 6a and 6b show a cartridge 50. The cartridge 50 has side walls 51. A lower end 53 of the cartridge defines the press button 15. An upper end 54 of the cartridge has threads 55 for receiving and retaining a pump 60 as will be described in more detail below.

Locating side protrusions 56 are provided on the external side of the cartridge side walls 51. These engage within recess 43 (and a corresponding recess on the opposing side of the internal walls 13) or within recess 44 (and a corresponding recess on the opposing side of the internal walls 13) defined in the outer container 40. This engagement within the recesses 43 or recesses 44 limits the degree of travel of the cartridge 50 within the outer container 40 and also prevents rotation of the cartridge 50 within the outer container 40.

It will be noted that the push button 15 is a contiguous part of the side walls 51 and thus, in the assembled device (shown in FIGS. 1; 2; 3; 4; 8a; 8b) when the push button 15 is pressed the entire cartridge 50 moves within the outer container 40 with protrusions 56 moving within the recess 43 or the recesses 44.

Apertures 57 which allow the ingress of air are provided in the button 15. Furthermore within the lower end 53 of the cartridge 50 is a piston 59 which comprises a seal 58. As anaerobically curable composition is pumped out of the cartridge 50 air is drawn in through apertures 57 to occupy the space below the seal 58. The pumping action thus progressively draws the piston 59 along the side walls 51, away from the lower end 53 toward the upper end 54 of the cartridge 50. The side walls 51 and the seal 58 (and the pump 60 when in place) define an enclosed reservoir 52 in which anaerobically curable composition can be held. Accordingly the volume of the anaerobically curable composition and the volume of the reservoir 52 will both reduce as anaerobically curable composition is dispensed. The piston 59 and the seal 58 thus move in the manner of an airless pump assembly.

Figure 7A:
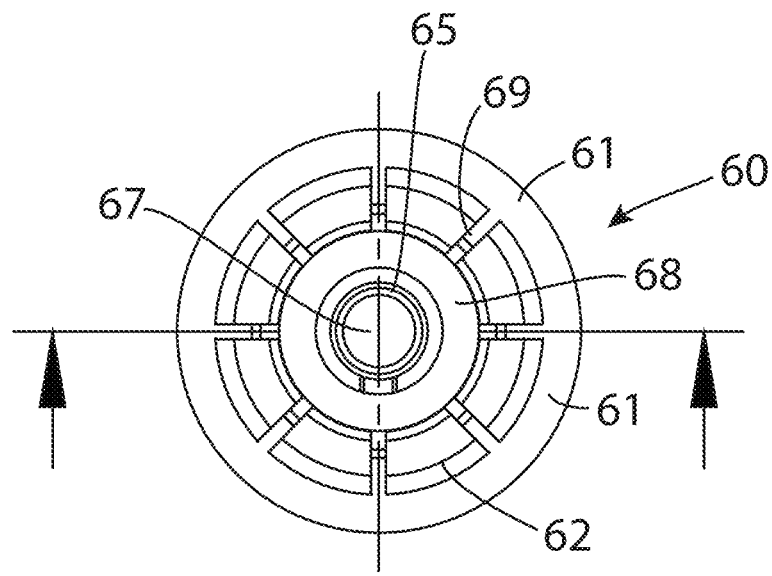
FIG. 7a is a side plan view of a pump which is part of the dispensing mechanism of the pack of the invention and also illustrating the direction of the cross sectional view of FIG. 7b.
Figure 7B:
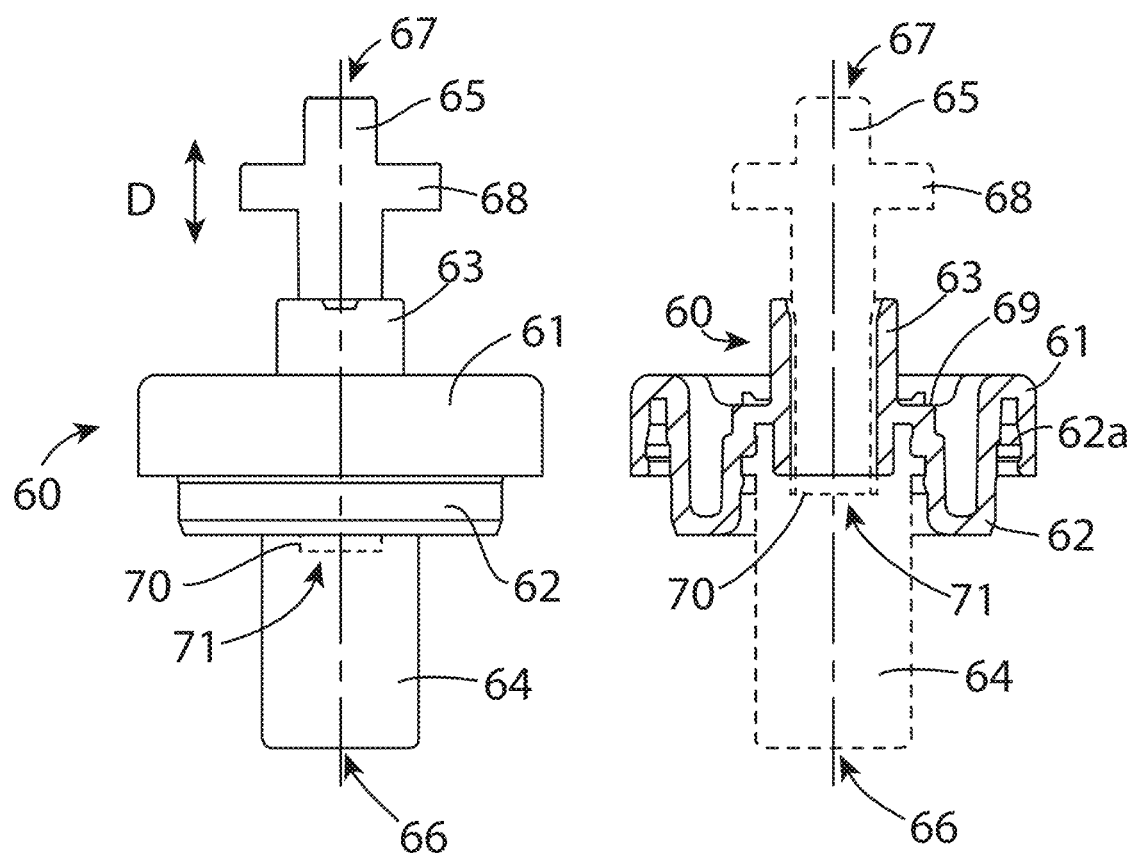

The pump 60 for use with a pack of the invention is shown in FIGS. 7a and 7b. The pump comprises a reciprocating nozzle 65 which moves relative to a retaining collar having inner and outer annular walls 61 and 62 respectively. The annular walls are joined by ribs 69. The reciprocating nozzle 65 is mounted within an annular conduit 63. It can reciprocate within the conduit 63 as shown by double headed arrow D. The reciprocal action is spring biased by a spring 72 (shown in cross-section in FIGS. 8a and 8b.)

The outer annular wall 61 has on the underside thereof threads 62a which engage with threads 55 on the upper end 54 of the cartridge 50 to allow the pump 60 to be mounted on the upper end 54 of the cartridge 50.

A lower end 70 of the reciprocating nozzle 65 has a valved inlet 71 and the lower end 70 protrudes into a (transparent) chamber 64. The chamber 64 has in turn a valved lower end 66. As the nozzle 65 reciprocates it creates a pump action drawing anaerobically curable composition from lower end 66 onto the nozzle 65 and out through the dispensing end 67 of the nozzle 65.

A collar 68 extending about the exterior of the nozzle 65 abuts internal ribs 19 of the outer container 40 when the pump 60 is assembled onto the cartridge 50 and the cartridge 50 is then inserted into the outer container.

Figures 8A, 8B:
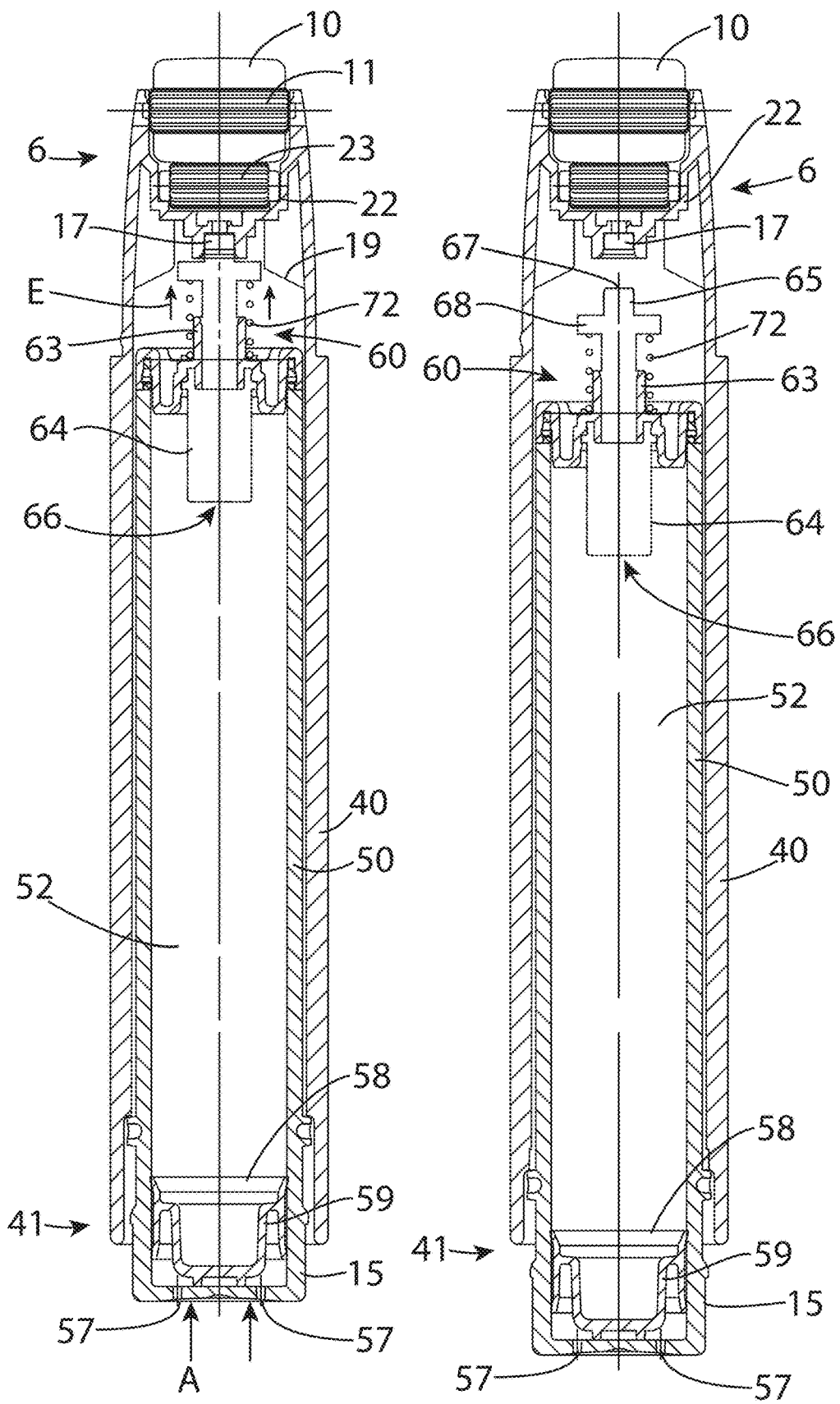
FIG. 8a is a cross-sectional view of the pack of the invention showing the comprising the outer container of FIGS. 5a and 5b, the cartridge of FIGS. 6a and 6b and the pump of FIGS. 7a and 7b all assembled together, and illustrating the dispensing action of the dispenser—in FIG. 8a the push button has been pressed to causing a dispensing action.
FIG. 8b is the same cross-sectional view as FIG. 8a except that the push button has been released.

FIG. 8a is a cross-sectional view of the pack of the invention comprising the outer container of FIGS. 5a and 5b, the cartridge of FIGS. 6a and 6b and the pump of FIGS. 7a and 7b all assembled together to form a pack comprising the dispenser 2 and anaerobically curable composition.

In FIG. 8a the cartridge 50, assembled together with the pump 60, is fully inserted into the outer container 40. As can be best seen from FIG. 8a the dispensing nozzle 65 of the pump 60 inserts into the nozzle 17 of the outer container 40.

It will be appreciated that in this assembled and operational configuration the lower end 53 of the cartridge 50 protrudes out the end 41 of the outer container 40 thus providing the push button 15. As the push button 15 is pressed as indicated by arrows A a number of things happen. The whole cartridge 50 is pushed inwardly relative to the outer container 40. The nozzle 65 of the pump 60 engages within nozzle 17 of the outer container. Continued pressing then causes the nozzle 65 to move in a direction opposite to the direction (indicated by arrows E) of the biasing force of the spring 72. This causes a pump action and results in anaerobically curable composition being drawn from the reservoir 52 of the cartridge 50 into the lower end 66 of the nozzle 65 and out through the dispensing end 67 of the nozzle 65 of the pump 60. This in turn causes anaerobically curable composition to be pumped through into nozzle 17 of the outer container 40 and out through it into the immersion chamber 22. In immersion chamber 22 it gets applied to immersion roller 23 and then in turn to foam roller 10 as described above.

Meanwhile the drawing action on the anaerobically curable composition causes a lower pressure and this results in piston 59/seal 58 advancing up the reservoir. Furthermore air is drawn in through apertures 57 allowing for the movement of the piston/seal 58.

When the button 15 is no longer being pressed the entire cartridge is returned to its original position under the biasing action of the spring 72.

This action can be repeated as many times as is desired for application of the desired amount of anaerobically curable composition.

It will be appreciated that as the reservoir 52, empties the seal 58/piston 59 advances up the cartridge 50 within the reservoir. It displaces by an amount in volume terms roughly equivalent to the volume of the anaerobically curable composition being dispensed. The seal 58/piston 59 thus progressively reduce the reservoir volume with dispensing of anaerobically curable composition This allows for the entire contents of the reservoir 52 to be dispensed by repeated pressing (and releasing) of the press button 15.

While the dispenser of the invention is shown as opaque it is desirably made of transparent material such as transparent polypropylene ("PP") as described above. In this way a user can see anaerobically curable composition within the reservoir and thus knows how much is used and how much is left.

Figure 9A:
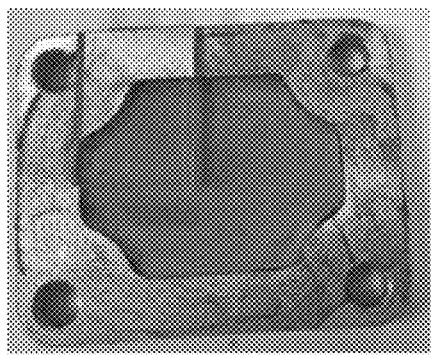
FIG. 9a is an image of an anaerobically curable composition sold by Henkel Corporation under the product name Loctite® 518 applied to a substrate by a pack as shown in previous figures.

FIG. 9a is an image of an anaerobically curable composition sold by Henkel Corporation under the product name Loctite® 518 applied by a pack of the invention as described above. As can be seen from the figure product has been applied to a substrate in a thin even layer. Approximately 0.15 g of the anaerobically curable composition was required to achieve this result. It will be noted that a glass slide has been applied to the substrate in the top left-hand corner thereof and this demonstrates that there is no excess material which is displaced of the substrate. This demonstrates visually what would occur if a second substrate were mated with the substrate shown.

Figure 9B:
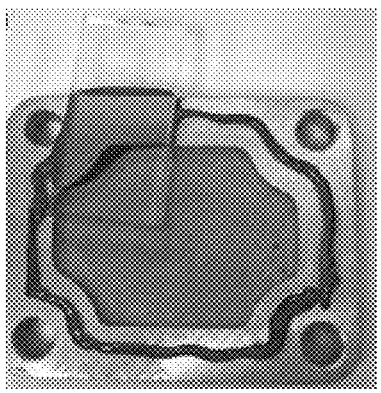
FIG. 9b is an image of an anaerobically curable composition sold by Henkel Corporation under the product name Loctite® 518 applied as a bead by a conventional cartridge.

FIG. 9b is an image of an anaerobically curable composition sold by Henkel Corporation under the product name Loctite® 518 applied by a cartridge to a substrate. It will be noted that the anaerobically curable composition has been applied in the form of a bead. In contrast with FIG. 9a it will be noted that when a glass slide has been applied to the substrate in the laptop left-hand corner thereof there is a large amount of excess material which is displaced. Again this demonstrates visually what would occur if a second substrate were mated with the substrate shown. Approximately 0.78 g of the anaerobically curable composition was utilised.

Accordingly, with a pack of the invention it is clear that a continuous unbroken layer of anaerobically curable composition can be applied. Furthermore the amount of material dispensed is far less. So a suitable continuous unbroken seal can be achieved easily with a pack of the invention using substantially less material.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A pack comprising:
   a dispenser for anaerobically curable composition; and anaerobically curable composition held within the dispenser,
   the dispenser comprising:
   (a) a reservoir in which anaerobically curable composition is held, the reservoir having an outlet through which the anaerobically curable composition can be dispensed;
   (b) a dispensing pump for pumping the anaerobically curable composition from the reservoir out through the outlet, the dispensing pump including a reciprocating nozzle;
   wherein the reservoir and pump together form an airless pump assembly, and
   (c) an applicator in communication with the outlet with an applicator surface, the applicator for applying to a substrate the anaerobically curable composition that is dispensed by the pump from the reservoir out through the outlet; and
   (d) a piston within the reservoir that progressively reduces the reservoir volume with dispensing of anaerobically curable composition;
   wherein the applicator is an applicator roller.

2. A pack according to claim 1 comprising a spreader which regulates dispensing of anaerobically curable composition onto the applicator so that the anaerobically curable composition is spread across the entire applicator surface.

3. A pack according to claim 2 wherein the spreader which regulates dispensing of anaerobically curable composition onto the applicator is a spreader roller.

4. A pack according to claim 3 wherein the spreader roller is mounted within an immersion chamber in which, in use, the spreader roller is immersed in anaerobically curable composition.

5. A pack according to claim 1 wherein the reservoir has opposing ends and the dispensing pump is provided on the same end of the reservoir as the outlet.

6. A pack according to claim 1 further comprising a valve for the outlet that is biased towards a closed position and wherein pumping by the dispensing pump draws the anaerobically curable composition through the valve so as to dispense the anaerobically curable composition out through the outlet.

7. A pack according to claim 1 wherein the dispenser further comprises a housing and further wherein:
   the reservoir and pump are assembled together in the form of a cartridge that is insertable into the housing.

8. A pack according to claim 7 wherein the applicator is on the housing.

9. A pack according to claim 8 comprising a spreader which regulates dispensing of anaerobically curable composition onto the applicator so that the anaerobically curable composition is spread across the entire applicator surface and wherein the spreader is located within a chamber in the housing.

10. A pack according to claim 1 wherein the reservoir and pump are assembled together with the pump provided on a closure for the reservoir.

11. A pack according to claim 1 wherein the applicator roller is a foam roller.

12. A pack according to claim 2 wherein the spreader is in the form of a spreader roller and the spreader roller is mounted within an immersion chamber in which, in use, the spreader roller is immersed in anaerobically curable composition.

13. A pack according to claim 1 wherein the piston draws along a side wall defining the reservoir when progressively reducing the reservoir volume with dispensing of the anaerobically curable composition.

14. A pack according to claim 1 wherein the piston has a seal, and wherein the piston is in sealed contact with a side wall defining the reservoir.

15. A pack according to claim 1 further comprising a button arranged at an opposite end of a dispensing end of the dispenser, wherein the actuation of the button causes a dispensing action by the dispensing pump.

* * * * *